United States Patent [19]

Ernst et al.

[11] 4,082,374
[45] Apr. 4, 1978

[54] AXIALLY MOVABLE BEARING DEVICE

[75] Inventors: Horst Manfred Ernst, Eltingshausen; Armin Olschewski; Lothar Walter, both of Schweinfurt; Rainer Schurger, Schwanfeld; Manfred Brandenstein, Aschfeld; Erich Burkl, Stammheim, all of Germany

[73] Assignee: SKF Industrial Trading & Development Company B.V., Nieuwegein, Netherlands

[21] Appl. No.: 707,531

[22] Filed: Jul. 22, 1976

[30] Foreign Application Priority Data

Aug. 16, 1975 Germany .............................. 2536658

[51] Int. Cl.² .......................................... F16C 27/06
[52] U.S. Cl. ................................. 308/6 C; 308/184 R
[58] Field of Search ............... 308/6 C, 216, 235, 241, 308/DIG. 8, 184 R

[56] References Cited

U.S. PATENT DOCUMENTS

| 3,464,745 | 9/1969 | Schaeffler | 308/6 C |
| 3,900,233 | 8/1975 | Thomson | 308/6 C |
| 3,907,384 | 9/1975 | McCloskey | 308/6 C |

Primary Examiner—Richard A. Bertson
Attorney, Agent, or Firm—Daniel M. Rosen

[57] ABSTRACT

An axially movable ball bearing includes a cage having a plurality of circumferentially distributed guideways, each guideway including first and second axially extending channels joined at their ends by semi-circular sections. A plurality of balls are provided in each of the guideways. The first channels are open radially inwardly so that the balls therein may engage a shaft along which the bearing is adapted to move. A thin-walled metal housing is tightly fitted over the cage, and has bridge sections aligned with the first channels. The bridge sections have on their radially inner surfaces, guide courses for engaging the balls in the first channels. The housing is slotted between the bridge sections, so that the second channels project radially outwardly between the bridge sections. The bridge sections are joined together at each axial end of the bearing by end rings. The metal housing has a greater hardness in the region of the courses of the bridge sections than in the other regions thereof.

2 Claims, 3 Drawing Figures

AXIALLY MOVABLE BEARING DEVICE

BACKGROUND OF THE INVENTION

This invention relates to bearings adapted to be axially movable and including a plurality of closed guideways for rolling elements, such as balls. The invention is particularly directed to bearings of this type which includes a cage for guiding the rolling elements and a thin-walled housing fitted over the cage.

In axially movable ball bearings structures of a known type, a generally tubular cage structure is povided having a plurality of closed guideways circumferentially distributed therein. Each of the guideways has a pair of axially extending guide channels, the guide channels of each pair being joined at their ends by semi-circular channels. One of the channels of each pair is open inwardly, to permit balls therein to engage a shaft. A thin-walled metal bearing housing is fitted over the cage, for example, by being forced axially over the cage. The thin-walled housing has bridge sections with courses or races engaging the balls under load, that is, the balls in the channels which are open radially inwardly. The bridge sections are joined together at the axial ends of the bearings, and the remaining channels of the cage project radially through the slots between the bridge sections.

In known ball bearing structures of this type, the thin-walled bearing housings were provided with either closed or partially slotted end rings for holding the bridge sections, and the bearing housings were hardened throughout. The hardening of the housings was effected since it is necessary for the courses or races of the bridge sections to be hardened. Since the bearing housings were hardened throughout, difficulties were occasioned in the production of the bearings. For example, the hardening of the bearing housings resulted in changes of their dimensions, as well as warping thereof. In addition, difficulties arose in the assembly of the ball bearing structure. In the normal technique for assembling the bearing, the bearing housing is pushed axially over the ball cage. In order to axially position the housing on the cage, either the cage or the bearing housing is provided with radial projections, and the bearing housing must be snapped in position with respect to these projections. As a consequence, in the assembly of the bearing housing, the housing, especially the end rings thereof, must be elastically stretched. Due to the brittleness of the end rings as a result of their hardening, however, such stretching of the housing was difficult, if not impossible.

The present invention is therefore directed to the provision of a bearing structure of the above type, wherein the thin-walled metal housing may be readily assembled over the bearing cage without danger of damage to the structure.

SUMMARY OF THE INVENTION

Briefly stated, in accordance with the invention, an axially movable bearing structure of the above type is provided, wherein the course or race-forming portions of the bridge sections of the housing have a hardness that is greater than the hardness of the housing outside of the bridge sections. Thus, in one embodiment of the invention, the metal bearing housing is partially hardened in the region of the courses or races of the bridge sections, while the remaining portions of the bridge sections, as well as the end rings, remain unhardened.

In accordance with the invention, since only a portion of the bridge sections are hardened, the warpage of the bearing housing following the process of hardening is held within limits, so that laborious reworking of the bearing housing or loss of the bearing housing due to excess warpage may be avoided. The unhardened end rings of the bearing housings may be easily expanded when the bearing housing is pushed axially out of the cage, and the bearing housing may be snapped onto corresponding projections or shoulders of the cage without danger of breaking of the housing due to expansion.

In order that the invention will be more clearly understood, it will now be disclosed in greater detail with reference to the accompanying drawings:

DETAILED DESCRIPTION OF THE PREFERRED EMBODIMENT

Figure 1:
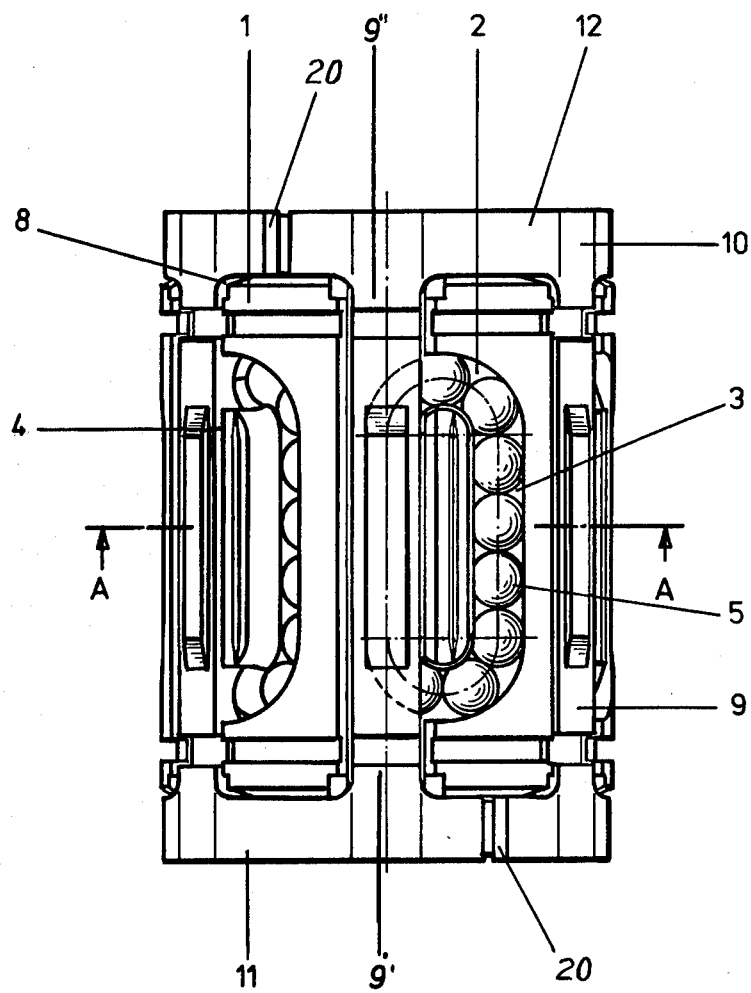
FIG. 1 is a top view of an axially movable bearing in accordance with the invention.

Referring now to the drawings, the axially movable bearing in accordance with the invention is comprised of a generally tubular cage 1 having a central axially extending hole 6 for receiving a shaft or the like. The cage 1 is provided with a plurality of circumferentially distributed closed guideways for rolling elements, such as the balls 5. Each of the guideways includes a pair of axially extending guide slots or channels 3 and 4, the channels 3 and 4 of each pair being interconnected at their ends by semi-circular cross-over channels 2. As a consequence, the balls 5 are guided in the closed guideways and held therein.

Figure 2:
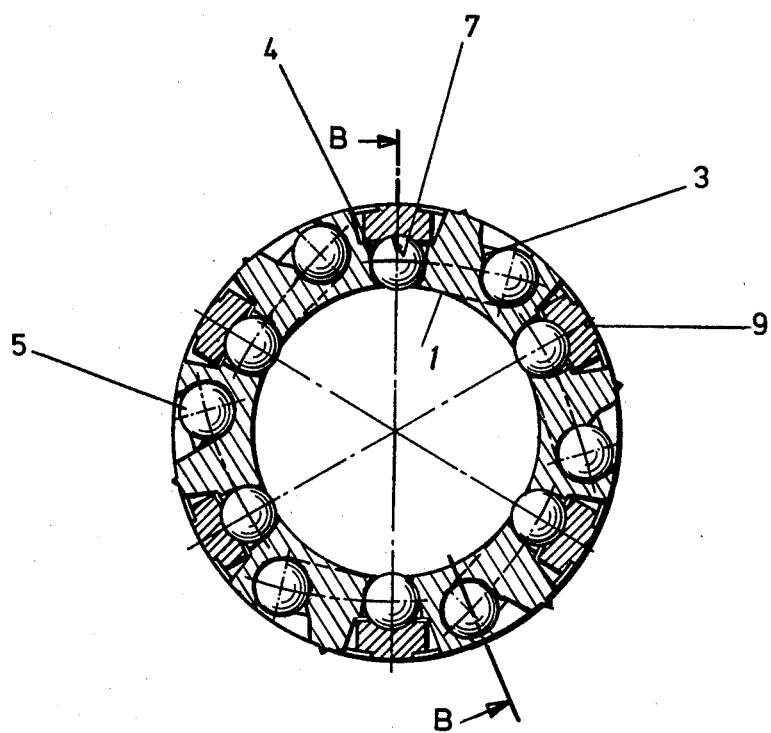
FIG. 2 is a transverse cross-sectional view taken along line A-A bearing of FIG. 1.
Figure 3:
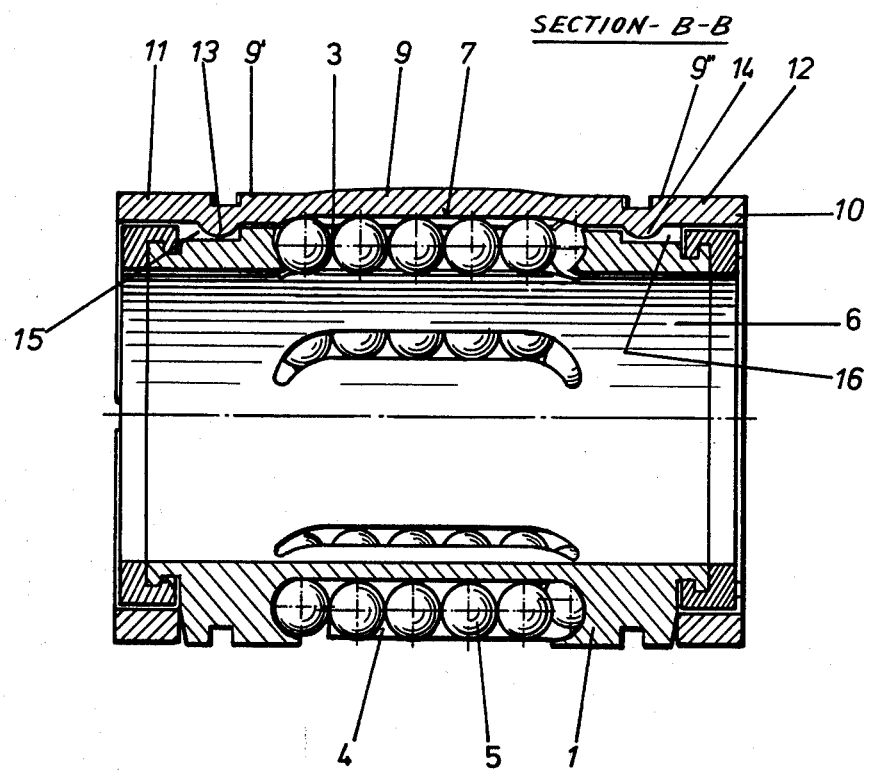
FIG. 3 is a longitudinal cross-sectional view of the bearing taken along line B-B of FIGS. 1 and 2.

The guide channels 4 are open radially inwardly of the cage, as illustrated in FIGS. 2 and 3, so that the balls therein may extend into the central bore 6 of the bearing and engage a shaft therein (not shown) to permit axial movement of the bearing with respect to the shaft. The balls 5 in the guide channels 4 are therefore load-carrying balls. In order to support the load-carrying balls 5 in the channels 4 radially outwardly of the channels 4, a metal bearing housing 10 is fitted over the cage, the bearing housing having axially extending bridge sections 9 aligned with the channels 4. The radially outwardly sides of the guide channels 4 are thereby formed by the course or race 7 on the radially inner edges of the bridges 9. As illustrated in FIGS. 1 and 3, the axial ends of the bridge sections 9 are joined by end rings 11 and 12. The bridges 9 are circumferentially separated from one another by slots 8, whereby the channels 3 carrying unloaded balls, as well as the balls in these channels, project radially outwardly through the slots 8 as is apparent in FIGS. 1 and 2. The bearing housing 10 is preferably assembled on the cage 1 by axially pushing the bearing housing over the cage.

As illustrated in FIGS. 1 and 3, radially inwardly extending projections 13, 14 are provided in the axial end 9', 9" respectively, of the bridges 9 beyond the courses or races 7. Recesses 15,16 are provided in the radially outer surface of the cage 1 for receiving the projections 13,14 respectively, so that the housing may be firmly held in its desired position on the cage 1.

In accordance with the invention, the regions of the bridges 9 in which the courses or races 7 extend are hardened, so that the load-carrying balls engage and roll along hardened surfaces of the housing. Contrary to prior practice, however, the axial end sections 9' and 9" of the bridges are not hardened, and the end rings 11,12 of the bearing housing are also not hardened. Accordingly, the end rings of the housing may be readily expanded in order to enable the assembly of the bearing housing on the cage by axially forcing the housing over the cage. Thus, the bearing housing 10 may be forced over the cage until the projections 13,14 thereof snap into position in the recesses 15,16 respectively of the cage. Since the end rings and end sections 9', 9" of the housing are not hardened, the required expansion of the housing may be effected without danger of damage to the bearing housing.

While, in the illustrated embodiment of the invention, the housing 10 is provided with projections 13, 14 for engaging recesses 15,16 respectively in the cage, it will, of course, be apparent that, alternatively, projections may be provided on the cage for engaging recesses in the housing.

The bearing housing 10 may be formed with closed end rings. Alternatively, as illustrated in FIG. 1, slots 20 may be provided in the end rings at one or more positions along their circumferences, in order to facilitate the assembly of the bearing. Further, the cage 1 may be formed of a plurality of separate parts, rather than as a unitary element as illustrated in the figures, so that during assembly of the bearing the required stretching of the bearing housing may be minimized or eliminated.

The bearing housing 10 may be formed from a cylindrical section of sheet metal, or it may be formed from a flat section of sheet metal rolled to have a cylindrical form. In the latter case, the hardening of the races of the bridges 9 can be effected either before or after the rolling of the section into cylindrical form.

It is further possible, in accordance with the invention, to employ a housing which has only one end ring.

While the invention has been disclosed and described with reference to a limited number of embodiments, it is apparent that modifications and variations may be made therein, and it is intended in the following claims to cover each such variation and modification as falls with the true spirit and scope of the invention.

What is claimed is:

1. In an axially movable bearing including a cage having a plurality of circumferentially distributed guideways for rolling elements, each guideway including first and second axially extending channels interconnected at their ends, rolling elements in said guideways, said first channels being open radially inwardly to permit rolling elements therein to engage a shaft, and a thin-walled metal bearing housing fitted over said cage, said housing comprising (i) bridge sections aligned with said first channels, each bridge section defining a race portion engaging the rolling elements in a first channel and end portions axially beyond said race portions, (ii) slotted sections between said bridge sections through which said second channels extend radially outwardly, and (iii) means at said end portions joining said bridge sections, the improvement wherein the race portion of each bridge section has hardness substantially greater than the end portions thereof, and said end portions define a generally straight bore except for projections extending radially inward from said bore surface, said projections defining an inner diameter slightly smaller than the outer diameter of said cage, and said cage includes recesses corresponding to said projections and extending radially inward for receiving said projections, said unhardened end portions being resiliently deformable to engage said cage and recesses, whereby said housing is removably secured into said cage.

2. A bearing according to clam 1 wherein said means joining said end portions of the bridge sections comprises a ring at each end of the bearing circumscribing and engaging said end portions.

* * * * *